E. H. B. KNOWLTON.
TOOL HOLDER.
APPLICATION FILED SEPT. 30, 1913.
1,191,797.
Patented July 18, 1916.
2 SHEETS—SHEET 2.
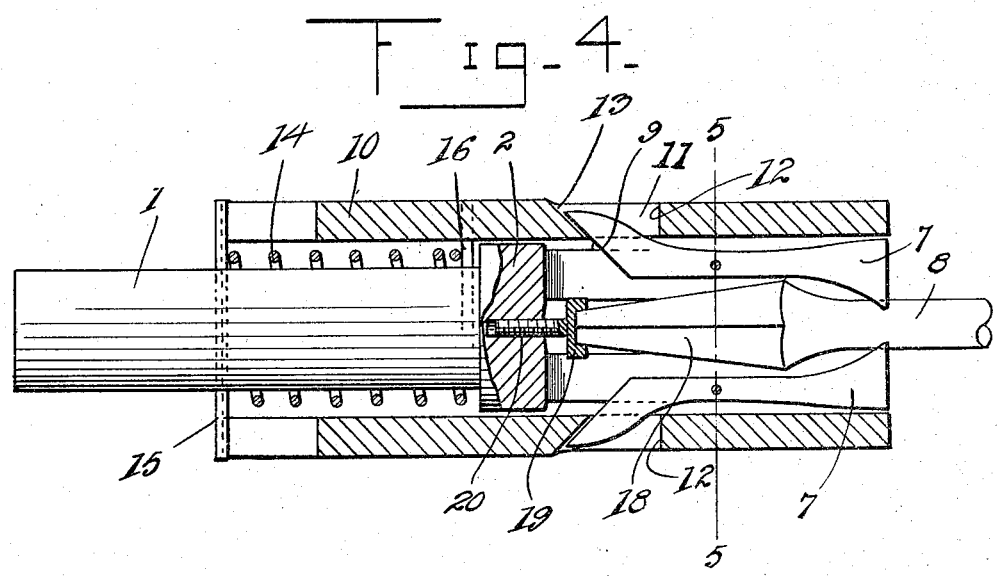
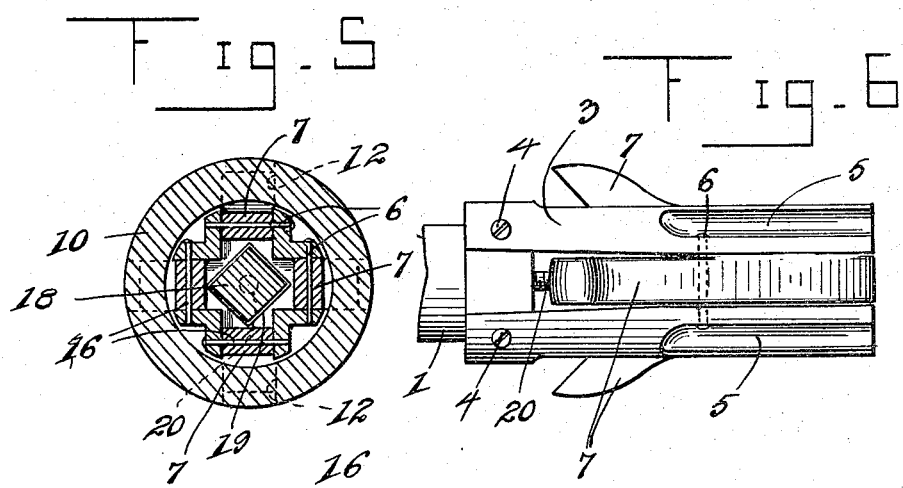
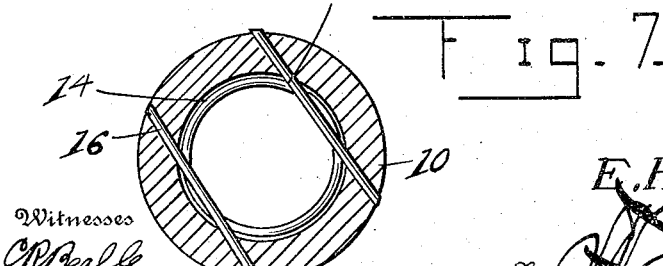
Inventor
E. H. B. Knowlton.
Witnesses

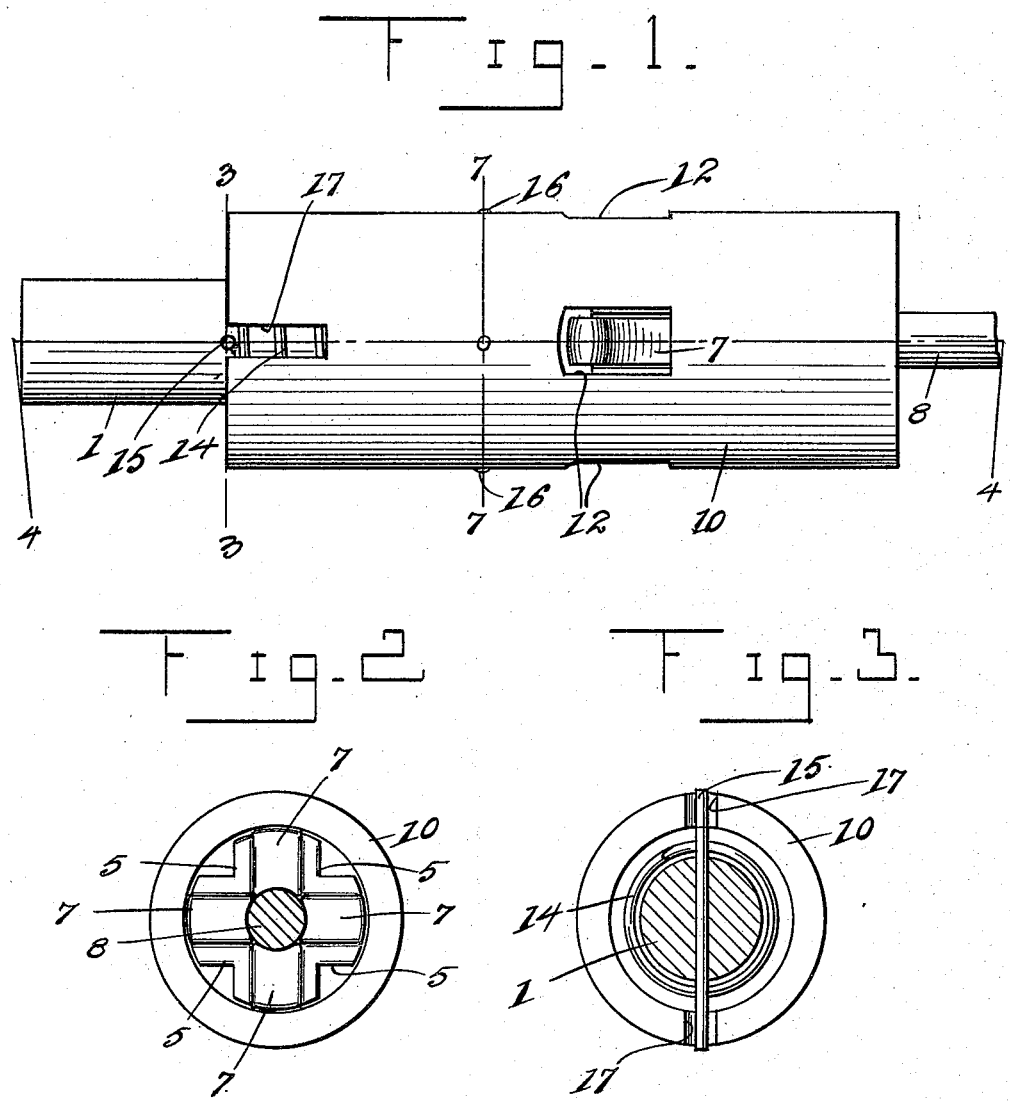

UNITED STATES PATENT OFFICE.

EPHRIAM H. BAKER KNOWLTON, OF MILWAUKEE, WISCONSIN.

TOOL-HOLDER.

1,191,797.  Specification of Letters Patent.  Patented July 18, 1916.

Application filed September 30, 1913. Serial No. 792,683.

*To all whom it may concern:*

Be it known that I, EPHRIAM H. BAKER KNOWLTON, a citizen of the United States, residing at Milwaukee, in the county of Milwaukee and State of Wisconsin, have invented certain new and useful Improvements in Tool-Holders; and I do hereby declare the following to be a full, clear, and exact description of the invention, such as will enable others skilled in the art to which it appertains to make and use the same.

This invention comprehends improvements in tool holders and relates more particularly to a chuck for holding bits and tools.

One of the objects of the invention is to provide a tool holder of this nature which shall be of extremely simple construction, practical, efficient and easy to operate.

Another and more specific object of the invention is to provide a tool holder including a shank, a plurality of arms rigidly secured to the shank, jaws pivoted intermediate their ends between said arms and a slidable sleeve for opening and closing the jaws.

The invention also aims to generally improve devices of this nature to render them more durable, reliable and commercially desirable.

With these and other objects in view as will become more apparent as the description proceeds, the invention consists in certain novel features of construction, combination and arrangement of parts as will hereinafter more fully described and claimed.

For a complete understanding of my invention, reference is to be had to the following description and accompanying drawings, in which—

Figure 1 is a side elevation of my improved holder, Fig. 2 is an end elevation with a bit shown in section, Fig. 3 is a section taken on a plane of line 3—3 of Fig. 1, Fig. 4 is a longitudinal sectional view partly in elevation, Fig. 5 is a transverse section taken on line 5—5 of Fig. 4, Fig. 6 is a fragmentary view showing in elevation a portion of the shank, the arms secured thereto and the jaws pivoted between said arms, and Fig. 7 is a section on the plane of line 7—7 of Fig. 1.

Referring in detail to the drawings by numerals, 1 designates a shank or mandrel which is used to secure the tool holder in position and which is formed upon its outer end with a head 2. A plurality of arms 3 are rigidly secured to the head by means of fasteners 4 and extend outwardly in essentially parallel relation. As clearly shown in the drawings the arms are formed upon their outer faces adjacent their outer ends with longitudinal recesses 5 which make it easy to secure the pivot pins 6 in position. These pins extend transversely across the spaces between each pair of arms and support the jaws 7. These jaws are secured to the pins centrally of their ends and are curved inwardly adjacent their forward ends as shown in Fig. 4 so as to engage the rounded portion 8 of a drill or bit. The jaws are extended outwardly adjacent their inner ends and have their inner extremities inclined rearwardly and outwardly as indicated by the numeral 9. A sleeve 10 surrounds the outer end of the shank and the arms which are carried by the shank. This sleeve is formed with a plurality of recesses 11 into which the inner ends of the jaws 7 extend. The outer end walls 12 of the recesses 11 extend at right angles to the axis of the sleeve whereas the inner end walls 13 are inclined to the axis so as to engage the inclined extremities 9 of the jaws.

To force the sleeve outwardly so that the jaws will be normally held in engagement with a tool which is inserted between them I employ a coil spring 14. This spring encircles the shank 1 and bears at its inner end against a pin 15 which extends transversely through said shank. The outer end of the spring bears against stop pins 16 secured in the sleeve 10. The ends of these pins are fixed in the wall of the sleeve and the central portions extend within the sleeve to form obstructions for the spring to bear against. To permit of the sleeve 10 being moved inwardly I provide the end opening recesses 17 through which the pin 15 extends.

To hold the end of the butt 18 of a tool against lateral movement I provide a socket 19 mounted upon a threaded shank 20. This shank threads into the head 2 of the shank 1 and may be rotated so as to change the distance of the socket 19 and the head.

When it is desired to secure a tool in the holder the butt of the tool is inserted between the jaws 7 and the extremity of said butt seated within the socket 19. If the shank 20 is not in the right position it may be moved inwardly or outwardly by rotating the tool. The spring 14 by bearing against the pins 16 forces the sleeve outwardly causing the inclined walls 13 to engage the inclined ends 9 of the jaws and close said jaws tightly upon the shank 8 of the tool.

When it is desired to remove the tool it is only necessary to grasp the sleeve and force it inwardly to cause the inner edges of the walls 12 to force the inner ends of the jaws 7 inwardly.

While I have shown and described the preferred embodiment of my invention, it will be understood that minor changes in construction, combination and arrangement of parts may be made without departing from the scope and spirit of the invention as claimed.

What is claimed is:—

In a tool holder, a shank having an enlarged head formed upon its outer end, a plurality of arms secured to and extending longitudinally from said head, each of said arms composed of a pair of plates disposed at right angles to each other, the plates of each of said arms being parallel to the corresponding plates of the arms next thereto, a plurality of jaws pivoted intermediate their ends to and positioned between the parallel plates of said arms, a slidable sleeve surrounding said shank and jaws, said sleeve being provided with a plurality of circumferentially spaced longitudinally extending openings, said openings having their inner walls inclined, the inner ends of said jaws being inclined to correspond with the incline of said end wall and provided for riding thereupon for rocking said jaws and forcing them into clamping engagement with the tool shank, means carried by said shank and engaging said sleeve for moving said sleeve longitudinally for forcing said inclined jaw ends upwardly along said inclined end walls, said head having a tool shank butt receiving socket adjustably carried thereby and extending forwardly toward the clamping ends of said jaws.

In testimony whereof I affix my signature in presence of two witnesses.

EPHRIAM H. BAKER KNOWLTON.

Witnesses:
 ARTHUR G. GRUETTNEG,
 CLARENCE E. FAHR.